Patented Nov. 8, 1949

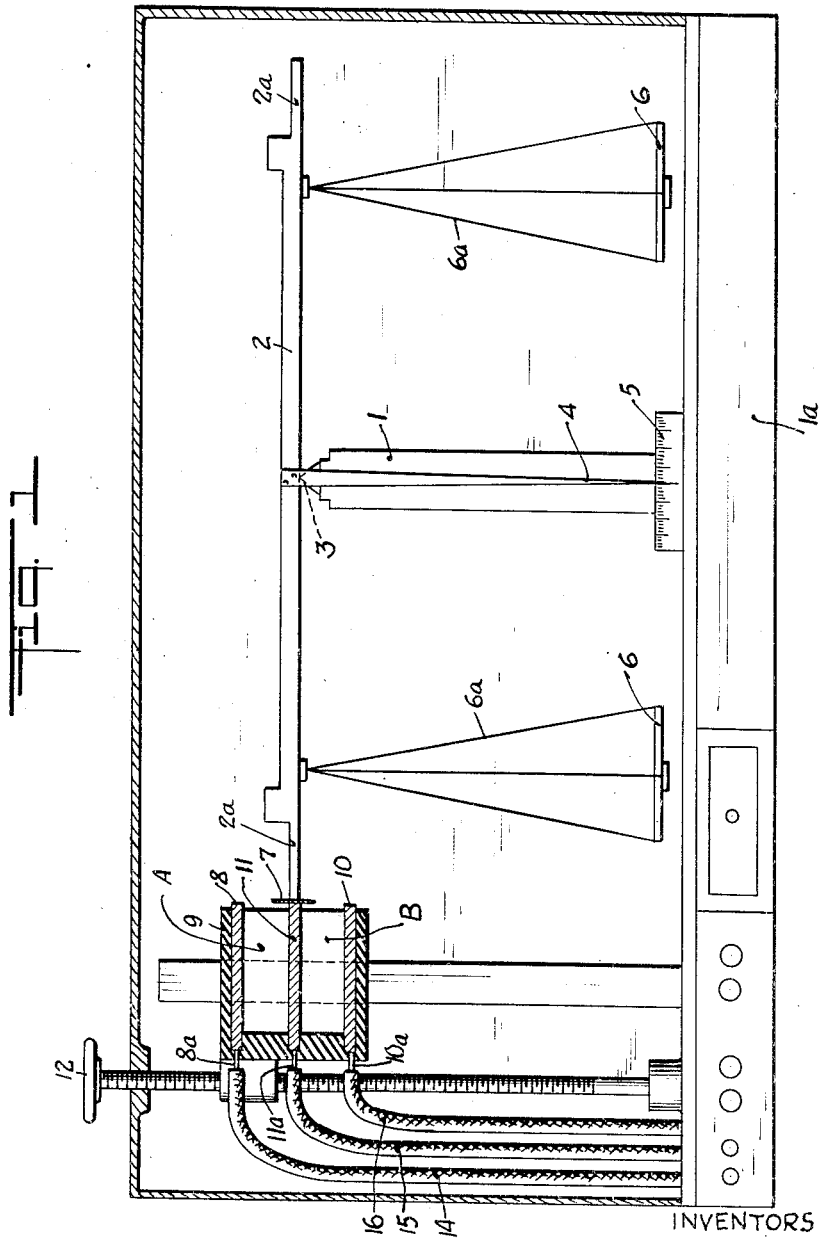

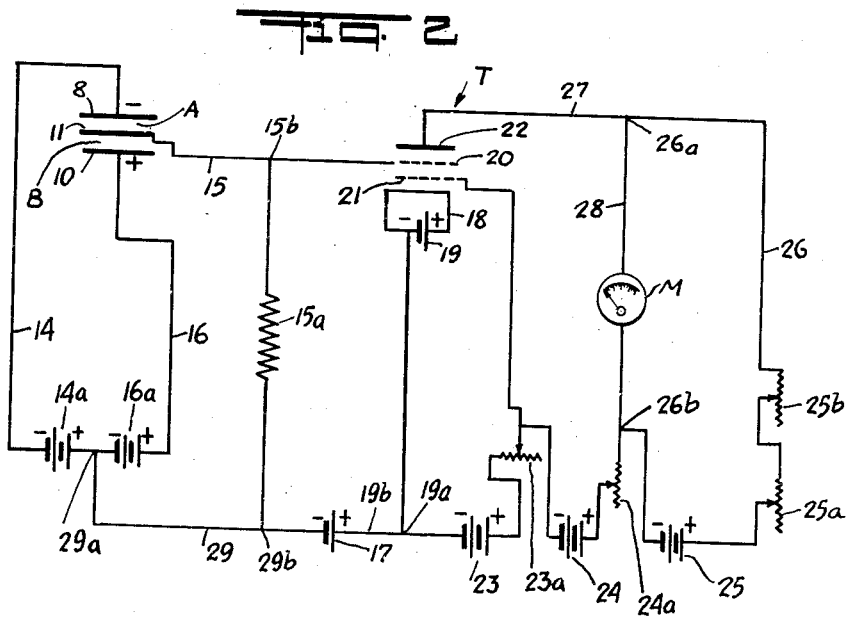
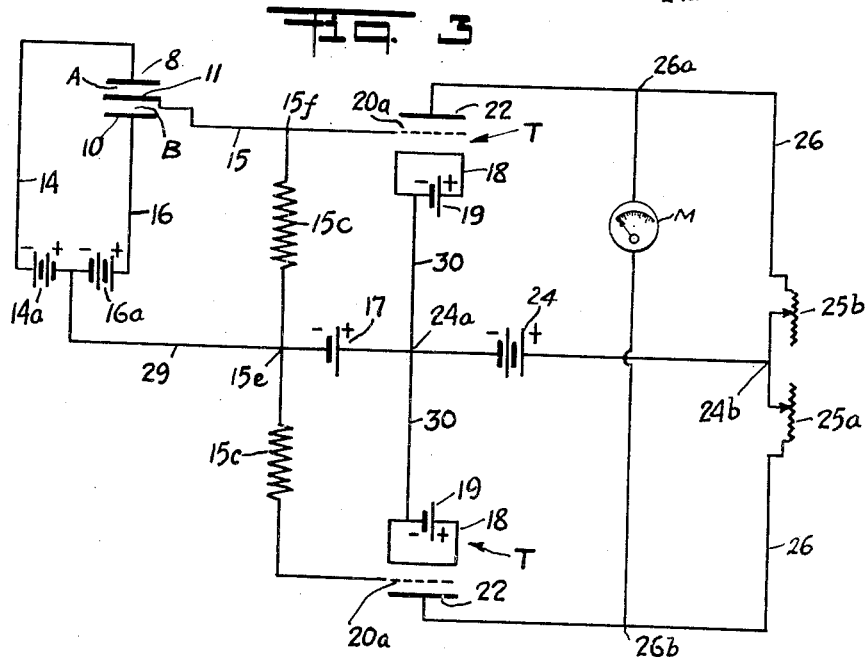

2,487,216

UNITED STATES PATENT OFFICE 2,487,216

APPARATUS AND METHOD FOR MEASURING MOVEMENT OF A BODY

Marietta Blau and Irving Feuer, New York, N. Y., assignors to Canadian Radium & Uranium Corporation, New York, N. Y., a corporation of New York Application February 27, 1947, Serial No. 731,380

6 Claims. (Cl. 250—83.6)

Our invention relates to a new and improved device and method for detecting and measuring the movement of a body. The invention is particularly useful in measuring weight.

According to our invention, we can determine a difference in weight as slight as one milligram to one microgram.

As one example of our invention, we embody the invention in a balance, to whose beam a radioactive member is connected. The ionization which is produced by means of the ionizing rays which are emitted by said radioactive member, is used to produce an ionization current whose value indicates the weight which is to be determined.

Numerous other objects and advantages of our invention are stated in the annexed description and drawings which illustrate a preferred embodiment thereof.

Fig. 1 is an elevation which diagrammatically illustrates one type of the improved weight-measuring apparatus.

Figs. 2 and 3 are respective diagrams of respective circuits which are used in combination with the apparatus of Fig. 1.

Fig. 1 shows as an example, a conventional balance which has a base 1a, a vertical column 1 which is fixed to said base 1a, and a beam 2 which is turnably mounted on said column 1 by means of a knife-edge 3, so that beam 2 turns about a horizontal axis. The usual pointer 4 is fixed to the beam 2, and said pointer 4 is associated with the usual scale 5, which is fixed to base 1a. The usual pans 6 are connected to the beam 2 by means of members 6a. The beam 2 is provided with respective reduced extensions 2a. A radioactive member 7 is fixed to a respective extension 2a. Said radioactive member 7 may be a planar sheet of foil, in which radioactive material is incorporated in the usual manner, or on which a film of radioactive material is deposited, so as to emit ionizing rays which ionize the gas adjacent said member 7, within the range of said ionizing rays. In this embodiment, the radioactive member 7 is shown as being of rectangular shape, and it is symmetrical with respect to the longitudinal axis of the associated extension 2a. This radioactive member 7 is associated with an ionization chamber 9, which is closed at its top and bottom by imperforate top and bottom horizontal walls, and which also has three vertical imperforate walls which are fixed to said top and bottom walls. Said chamber 9 is open at its side thereof which is proximate to the radioactive member 7. Horizontal plates 8, 11 and 10, made of brass or bronze or any other suitable metal, are fixed to the three vertical imperforate walls of said chamber 9. Said plates 8, 11 and 10 are parallel and identical and their proximate parallel faces are equally spaced, so as to provide an upper ionization chamber A and an identical lower ionization chamber B between said plates. The ionizable atmosphere in said ionization chambers A and B may be air under normal pressure of 760 mm. of mercury. The top face of plate 8 abuts the bottom face of the top wall of the chamber 9, and the bottom face of the plate 10 correspondingly abuts the top face of the bottom wall of the chamber 9.

The height of the chamber 9 relative to base 1a and the radioactive member 7, can be adjusted by means of the usual adjusting screw 12, so that when the beam 2 is absolutely horizontal, the radioactive member 7 extends equally above and below the median plate 11, in order equally to ionize the gaseous atmosphere of the upper ionization chamber A and the lower ionization chamber B. The plates 8, 11 and 10 are respectively connected by wires 8a, 11a, and 10a, to respective flexible and shielded cables 14, 15 and 16, which lead to the measuring and amplifying circuit.

Fig. 2 shows a measuring and amplifying circuit, which utilizes a single amplifier tube T. In this example, said amplifier tube T is a tetrode of the well-known type designated as "UX-41." We can use any type of amplifier.

Fig. 2 shows identical batteries 14a and 16a, which may have equal voltages of 67 volts. The positive terminal of battery 16a is connected by cable 16 to bottom plate 10. For convenience, the wires 8a, 11a and 10a are not shown in Fig. 2. The negative terminal of the battery 14a is connected by cable 14 to the top plate 8.

When the gaseous atmospheres of the ionization chambers A and B are ionized to produce respective ionization currents, negative ions will travel in the bottom ionization chamber B to the bottom plate 10, and positive ions will travel to the median plate 11, to be deposited on said median plate 11. Positive ions will be attracted to the top plate 8 in the upper ionization chamber A, and negative ions will be deposited in said ionization chamber A upon the median plate 11. Since the batteries 14a and 16a are identical, the median plate 11 will be maintained at zero potential if there are equal ionization currents in the atmospheres of the respective chambers A and B. One end of a wire 29 is connected to the neutral point 29a, between the batteries 14a and 16a. Said wire 29 is connected at the point 29b, through a resistor 15a, to the point 15b. The resistance of the resistor 15a is high, as 100 megohms, namely, $10^8$ ohms. The cable 15 of the median plate 11 is connected to the injector or input grid 20 of the electronic amplifier tube T, which has an anode 22, a screen grid 21 and a cathode 18. The cathode 18 is conventionally shown as having a heating battery 19, whose negative terminal is connected to the point 19a and through the wire 19b to the positive terminal of a grid bias battery 17, whose negative terminal is connected through the resistor 15a to the point 15b and hence to the injector grid 20.

The screen grid 21 is connected through the potentiometer resistor 23a, through a selected part of the resistance of said resistor 23a, to the positive terminal of a bias battery 23 for said screen grid 21. The voltage of the battery 23 is about 4 volts. The negative terminal of the battery 23 is connected to the point 19a and hence to the negative terminal of the heater battery 19 and to cathode 18. The positive terminal of the plate battery 24 is connected through a selected part of the resistance of the potentiometer resistor 24a, through a meter M and the wires 28 and 27 to the anode 22. The negative terminal of the plate battery 24, which has a potential of about 6 volts, is adjustably connected to the adjustable contact of the potentiometer resistor 23a, and hence to the cathode 18.

The figures stated herein are merely illustrative in order to disclose one practical embodiment, and the invention is not limited thereto.

When the ionization currents in the chamber A and B are equal so that the ionization currents in chambers A and B maintain intermediate plate 11 at zero potential, minimum current will flow through the meter M.

In order to provide a zero reading in the meter M, when the ionization currents in chambers A and B are equal, we provide a compensating circuit which includes a compensating battery 25 whose potential is about 1.5 volts. The negative terminal of compensating battery 25 is connected at 26b to one side of meter M, above the top of the potentiometer resistor 24a. The positive terminal of battery 25 is connected through selected parts of the resistances of respective potentiometer resistors 25a and 25b, to a wire 26 which is connected to the point 26a.

When the respective ionization currents in chambers A and B are equal, which is the case when beam 2 is horizontal, the current of plate battery 24 in the plate-cathode circuit 22—18 is preferably small, so that meter M would then have a low reading, if the compensating circuit of battery 25 were omitted. By suitably adjusting the contact points of potentiometer resistors 24a, 25a, and 25b, the current through meter M, under said conditions, can be reduced to zero by means of the compensating circuit.

In such case, the voltage drop of plate battery 24 between the points 26b and 26a, will be equal to the opposed voltage drop of compensating battery 25 between said points 26b and 26a, and said points 26b and 26a will be at the same potential.

When the respective ionization currents of the chambers A and B are unequal, corresponding to an inclined position of beam 2, a positive or negative voltage is impressed by said unequal ionization currents upon the plate 11, and hence upon the injector grid 20, thus varying the current through the meter M, whose scale can be calibrated so as to indicate the difference in the weights which are located in the respective pans 6.

Thus, if beam 2 is tilted clockwise from its horizontal position of Fig. 1, thus raising the radioactive member 7 above its median or neutral position in which the ionization currents are equal, the ionization current in upper chamber A will exceed the ionization current in lower chamber B. In such case, the positive ions which are deposited upon the top face of median plate 11 will exceed the negative ions which are deposited upon the bottom face of plate 11, thus impressing a positive potential bias upon median plate 11 and hence upon the input grid 20, and thus increasing the plate-cathode current between plate 22 and cathode 18, through the amplifier tube T.

If beam 2 is tilted counterclockwise from its horizontal position of Fig. 1, the ionization current in lower chamber B will exceed the ionization current in upper chamber A. In such case, the negative ions which are deposited upon the bottom face of the conductive median plate 11 will exceed the positive ions which are deposited upon the top face of the conductive median plate 11, thus impressing a negative potential upon median plate 11 and hence upon the input grid 20.

In this illustrative embodiment, the median plate 11 is maintained at a selected negative potential, as well as the input grid 20, because said plate 11 is in effect an extension of input grid 20.

The circuit of Fig. 3 utilizes two amplifier tubes T which may be triodes or tetrodes or of any type, thus eliminating the necessity for using the compensating circuit of Fig. 2. As an example, the electronic tubes T are triodes.

In Fig. 3, the median plate 11 is connected to the grid 20a of one of the amplifying triodes T. Grid 20a of the other amplifying triode T is connected to the point 15e, through a resistor 15c, whose resistance may be 1000 megohms, namely $10^9$ ohms. The point 15f is connected to the point 15e, through another resistor 15c, whose resistance is also 1000 megohms. The negative terminal of the grid bias battery 17 is connected to the point 15e, and the positive terminal of said grid bias battery 17 is connected at point 24a through wires 30 to the respective cathodes 18 of the respective electronic tubes T.

The negative terminal of the plate battery 24 is connected to the point 24a and hence through the wires 30 to the respective cathodes 18, and the positive terminal of said plate battery 24 is connected to the point 24b. Said point 24b is connected through the respective adjustable contacts of the respective potentiometer resistors 25a and 25b, through the wires 26 to the respective plates or anodes 22 of tubes T, and also to the points 26a and 26b which are connected to the respective terminals of the microammeter M, which can be replaced by any other type of measuring device.

The maximum current through meter M is optionally small, about 50 microamperes.

When the beam 2 is horizontal, so that chambers A and B are equally ionized and their respective ionization currents are equal, plate 11 is at zero potential. The same bias voltage exists on the grids 20a of the two tubes T, and they have approximately equal plate currents. Furthermore, if the voltage of either battery 14a or battery 16a should fluctuate, the resulting change in grid bias would be the same for both tubes T. The effective resistance of the resistors 25b and 25a in the circuit is adjusted so that the points 26a and 26b are at the same positive potential, so that no current will then pass through the microammeter M. When the beam 2 is no longer horizontal, and the ionization currents are no longer equal, the bias on the one tube T connected to plate 11 is varied, thereby producing a current through microammeter M.

The invention can be applied to any purpose in which it is desired to detect and to measure the movement of a body from a selected normal position. In this particular case, the body is the beam 2, and said beam is in said normal selected position when it is horizontal. However, the beam 2 may be inclined to the horizontal direction when it is in its selected normal position.

In the preferred embodiment, no current is sent through the meter M when the member 2 is in its selected normal position, because the respective ionization currents are then equal in the chamber A and B. However, the invention is not necessarily limited to this, because in the normal position of the beam 2, the respective ionization currents may be unequal in the chambers A and B. This would require merely a different calibration of the scale of the meter M.

We have described preferred embodiments of our invention, but numerous changes and omissions and additions and substitutions can be made without departing from its scope.

The conductive plates 8, 10 and 11 operate as electrodes of the ionization chambers A and B, the median plate 11 being the common electrode of said two ionization chambers. Plates 8 and 11 are supplemental electrodes.

The invention includes the sub-combinations disclosed herein.

Instead of directly connecting the ionizing member 7 to the movable member 2, said connection may be indirect. While we prefer to ionize a gaseous atmosphere, the medium in the ionizing chamber may be an ionizable liquid. Hence, when we refer to the ionization of a fluid, we are not limited to the ionization of a gas or mixture of gases. If the ionizable medium is a liquid, it can be confined in the casing 9 by an additional wall between the electrodes 8, 10 and 11 and said wall can have a window of the well-known type which is permeable to the ionizing ray or rays. The ionizing means may be of any type. The vertical spacing between the proximate faces of the electrodes 8, 10 and 11 may be 10 millimeters. Under the selected impressed voltage, each current through the respective ionizable fluids in the chambers A and B is limited to an ionization current, which is zero when the ionization is zero.

The maximum ionization current in each of chambers A and B is limited to a threshhold current of a few microamperes, so that the ionization current is proportional to the number of ions which are produced by the ionizing means.

What is claimed is:

1. Apparatus for measuring the movement of a body from a selected position, comprising an ionizing source fixed to said body, a pair of ionization chambers located in the ionizing range of said ionizing source, said ionization chambers having ionizable gaseous atmospheres, said body being movable relative to said ionization chambers, said body being movable to a position in which said ionizing source is located to ionize both said gaseous atmospheres, said ionization chambers having a common electrode, each said ionization chamber having a supplemental electrode which is associated with and which is spaced from said common electrode, said common electrode being located between said supplemental electrodes, said respective supplemental electrodes being respectively connected to the respective opposed terminals of a source of electric current in order to impress potentials of respective different signs on said supplemental electrodes and to collect oppositely charged ions on said supplemental electrodes from said respective ionized gaseous atmospheres and to deposit oppositely charged ions on said intermediate electrode from said gaseous atmospheres to impress an ionization potential thereon, an amplifier electron tube which has a control grid and a cathode and an anode and a plate battery connected to said cathode and anode through an electric meter, said intermediate electrode being connected to said control grid.

2. Apparatus according to claim 1, in which said body is a movable member of a weight-measuring device.

3. Apparatus according to claim 1, in which said body is the beam of a weight-measuring balance.

4. Apparatus according to claim 1, in which said electrodes are equally spaced and said ionization potential is zero when said body is in said selected position.

5. Apparatus for measuring the movement of a body from a selected position, comprising an ionizing source fixed to said body, a pair of ionization chambers located in the ionizing range of said ionizing source, said ionization chambers having ionizable gaseous atmospheres, said body being movable relative to said ionization chambers, said body being movable to a position in which said ionizing source is located to ionize both said gaseous atmospheres, said ionization chambers having a common electrode, each said ionization chamber having a supplemental electrode which is associated with and which is spaced from said common electrode, said common electrode being located between said supplemental electrodes, said respective supplemental electrodes being respectively connected to the respective opposed terminals of a source of electric current in order to impress potentials of respective different signs on said supplemental electrodes and to collect oppositely charged ions on said supplemental electrodes from said respective ionized gaseous atmospheres and to deposit oppositely charged ions on said intermediate electrode from said gaseous atmospheres to impress an ionization potential thereon.

6. A method of ascertaining the movement of a body to which ionizing means are connected, which consists in ionizing two alined bodies of ionizable fluid which are located in the range of the ionizing emanation of said ionizing means by said ionizing means, subjecting said bodies of fluid to opposed differences of potential to cause oppositely charged ions to travel in respective opposed directions in said respective alined bodies in respective ionization currents and collecting oppositely charged ions from said respective alined bodies on a common electrode, said bodies of fluid being substantially non-conductive when tion-ionized, and measuring the potential of said common electrode, said respective ionization currents being proportional to the respective ionizations of said bodies of fluid.

MARIETTA BLAU.
IRVING FEUER.

REFERENCES CITED

The following references are of record in the file of this patent:

UNITED STATES PATENTS

| Number | Name | Date |
|---|---|---|
| 2,094,318 | Failla | Sept. 28, 1937 |
| 2,315,819 | Schlesman | Apr. 6, 1943 |

OTHER REFERENCES

Review of Scientific Instruments, vol. 17, November 1946, p. 517.